United States Patent [19]
Klaiber

[11] Patent Number: 4,925,215
[45] Date of Patent: May 15, 1990

[54] CONCEALED MAGNETIC INDICIA

[75] Inventor: Martin S. Klaiber, Perrysburg, Ohio

[73] Assignee: Action Drive-Thru Inc., Toledo, Ohio

[21] Appl. No.: 365,008

[22] Filed: Jun. 12, 1989

[51] Int. Cl.⁵ .............................................. F16L 35/00
[52] U.S. Cl. ...................................... 283/82; 283/904; 283/74
[58] Field of Search .................. 283/901, 904, 82, 74, 283/75; 101/369

[56] References Cited

U.S. PATENT DOCUMENTS

| | | | |
|---|---|---|---|
| 3,684,869 | 8/1972 | Reiter | 117/239 |
| 3,761,683 | 9/1973 | Rogers | 235/61.11 R |
| 3,895,220 | 7/1975 | Nelson | 283/82 |
| 4,186,944 | 2/1980 | Pearce | 283/58 |
| 4,455,039 | 6/1984 | Weitzen et al. | 283/83 |
| 4,511,616 | 4/1985 | Pitts et al. | 428/203 |

*Primary Examiner*—Douglas D. Watts
*Assistant Examiner*—Thomas Hamill, Jr.
*Attorney, Agent, or Firm*—Harold D. Shall

[57] ABSTRACT

A paper token upon which there is printed an indicia in a first ink which contains iron oxide particles and which indicia is overprinted with a second ink not containing magnetic particles. The first and second inks are dissolvable by the same solvent and the two inks are physically bonded together.

2 Claims, 1 Drawing Sheet

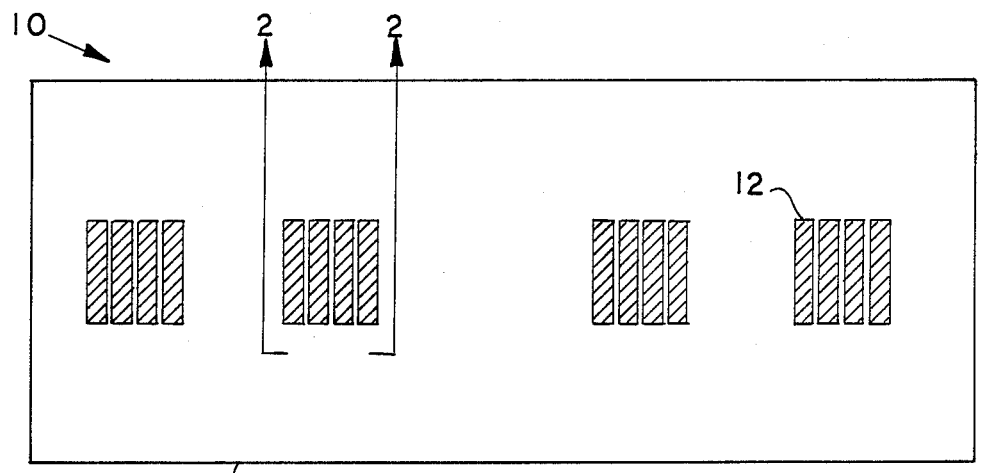
FIG_1
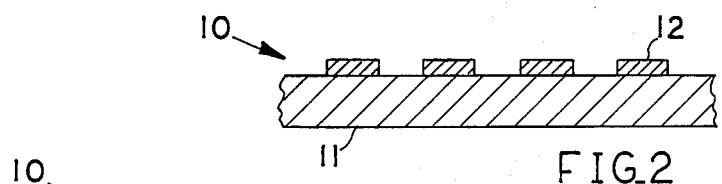
FIG_2
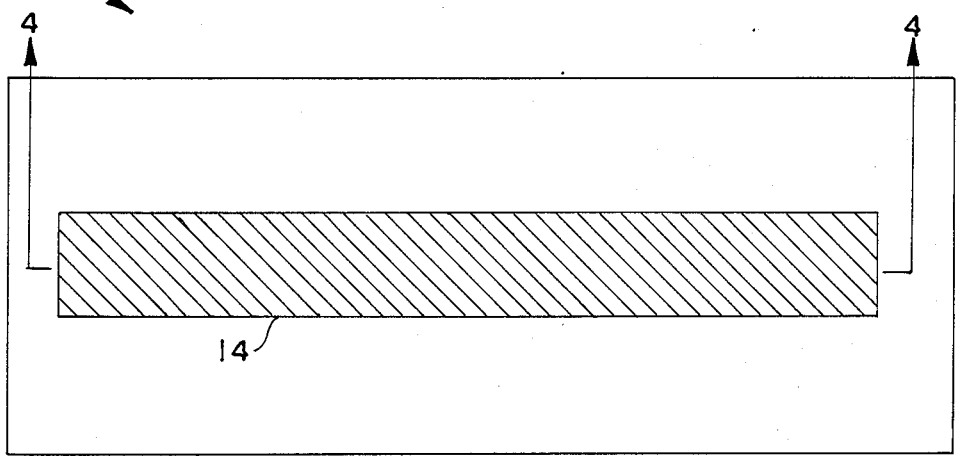
FIG_3
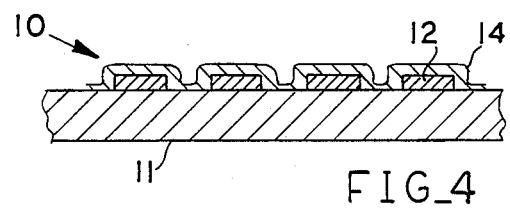
FIG_4

CONCEALED MAGNETIC INDICIA

BACKGROUND OF THE INVENTION

This invention relates to concealed magnetic indicia generally and more particularly to a paper token having a magnetic code printed thereon with ink having magnetic particles therein which is overprinted by ink which does not have magnetic particles therein to thereby prevent the copying of the magnetic code by the simple act of utilizing a duplicating machine having magnetic particle copying media therein commonly referred to as "toner."

Concealed indicia has been in wide spread use for many years primarily for the purpose of having the exterior coating Protect the interior coating from wear or damage such as shown by U.S. Pat. No. 3,684,869.

Other patents have shown magnetic layers with a concealing layer thereover such as seen in U.S. Pat. Nos. 4,315,145, 4,511,616 and 4,455,039, however none of these patents discloses a structure where the overprinting ink and the magnetic code ink will be removed by the same solvents nor where the two inks are so physically bonded that attempted removal of the overprinting ink, as by erasing, will remove the magnetic ink. Thus the magnetic ink cannot be revealed for copying by solvents, erasing or physical abrading to reveal the underlying magnetic coating. For if the concealing or overlying coating can be removed, the magnetic coating ca easily be copies on a duplicating machine using magnetic toner, that is a toner having iron oxide particles therein to thereby duplicate the magnetic code.

This is of particular importance when the magnetic ink is used to print a code on a paper token which will be utilized in a magnetic reading machine such as described in U.S. Pat. No. 4,349,111. With a non-magnetic ink printed over the coded ink the paper token could still be read and identified by the machine. However, with the two inks being removed by the same solent or during physical abrading, it is highly unlikely that the overprinted ink will be removable so that the coded ink can be duplicated on a copying machine with magnetic particles.

It is therefore desirable to have a non-magnetic paper token with a magnetic ink code layer thereon overprinted by a non-magnetic ink layer with the two layers being susceptable to the same solvents and with both being simultaneously removed by physical abrading.

SUMMARY OF THE INVENTION

The present invention provides a non-magnetic paper token upon which there is printed an indicia in a first ink which contains iron oxide magnetic particles and which indicia is overprinted with a second ink not containing magnetic particles. With the first and second inks being dissolved by the same solvent and the two inks being physically bonded together such that if the second ink is attempted to be removed by physical abrading, then both inks will be removed.

BRIEF DESCRIPTION OF THE DRAWINGS

FIG. 1 is a plan view of a paper token with a code printed thereon in magnetic ink;

FIG. 2 is a sectional view taken substantially along the lines 2—2 in FIG. 1;

FIG. 3 is a plan view of a paper token with a code printed thereon in magnetic ink which has been overprinted by a second layer of ink which does not contain magnetic particles and;

FIG. 4 is a fragmentary view of the paper token of FIG. 3 taken along the lines 4—4 in FIG. 3.

DETAILED DESCRIPTION

Referring now to the drawings and more particularly to FIG. 1, a paper token 10 consists of a sheet of non-magnetic substrate in the form of a sheet of paper 11 which has printed thereon in magnetic ink a series of bars 12 making up a code; which code is capable of being read by a machine similiar to the machine shown and described in U.S. Pat. No. 4,349,111. In FIG. 2, the bars of the code are shown as they project slightly above the surface of the token. If the code is the proper code, the machine will accept the token whereas if the code is not the proper code, the machine will reject the token.

If nothing further was done to the paper token so that it looked in its finished state as it does in FIGS. 1 and 2, the paper token would be susceptable to being counterfeited by merely taking the same to a copying machine having magnetic toner therein and running copies of the paper token, such copies would have bars thereon duplicating the bars 12 on the paper 11. The machine shown in U.S. Pat. No. 4,349,111 would accept such counterfeit tokens, for it would have no way of knowing whether or not it was the original or a duplicate.

An ink which has been found to be acceptable for the purpose of printing the bars 12 of the code on the paper token 10 is available from the I.P.I. Inmont Corp. of Clifton, N.J. and sold under the description of "Magnetic Ink, I.P.I. Magnetic Black PL-401" and is a black ink containing iron oxide particles.

Referring now to FIGS. 3 and 4, the bars 12 are no longer visible since they have been overprinted by using a second ink. As shown at 14. A suitable ink for use as the second ink is obtainable from Kohl & Madden D.I.C. Americas' Inc. of Hasbrouck Heights, N.J. and sold under the name "Dence Black MSP34220-S".

These two inks, when overprinted as described, become physically bonded so that they cannot be separated by physical abrading without destroying varying or obliterating the bar code 12 that will be red by the machine.

The two inks are also susceptible to the same solvent known as MS408-glaze cleaner consisting of 50% Toluol, 25% Methanol and 25% Acetone. Thus if someone were to attempt to remove the second ink layer 14 and not alter the first ink layer 12, such would be impossible to do and at least some variation would be caused to the first ink 12 so that the reading machine would reject the token.

Although the above description relates to a presently preferred embodiment, modifications can be made therein without departing from the spirit of this invention as defined in the following claims:

What is claimed is:

1. A magnetically coded token comprising:
 (a) a sheet of non-magnetic substrate;
 (b) a first layer of spaced indicia on said substrate formed with an ink containing particles of iron oxide;
 (c) a second opaque layer of iron oxide-free ink overlying, concealing and bonded to said first layer; and, (d) the ink of said first layer being I.P.I. Magnetic Black PL 401 and the ink of said second layer being Dence Black MSP 34220S; and, (e) said layers being so connected that said second layer cannot be removed without at least partially destroying said spaced indicia of said first layer.

2. A token as defined by claim 1 in which said substrate is paper.

* * * * *